United States Patent

Cubert

[15] 3,654,486

[45] Apr. 4, 1972

[54] TRANSISTOR LOGIC CIRCUIT WITH UPSET FEEDBACK

[72] Inventor: Jack S. Cubert, Willow Grove, Pa.

[73] Assignee: Sperry Rand Corporation, New York, N.Y.

[22] Filed: May 26, 1970

[21] Appl. No.: 41,698

Related U.S. Application Data

[63] Continuation of Ser. No. 452,191, Apr. 30, 1965, abandoned.

[52] U.S. Cl. .............................307/214, 307/218, 307/237, 307/300

[51] Int. Cl. ...............H03k 19/40, H03k 19/22, H03k 19/30

[58] Field of Search ..........................307/214, 218, 237, 300

[56] References Cited

UNITED STATES PATENTS

| | | | |
|---|---|---|---|
| 2,887,542 | 5/1959 | Blair et al | 307/200 X |
| 3,280,342 | 10/1966 | Ashley | 307/237 X |
| 2,999,169 | 9/1961 | Feiner | 307/88.5 |
| 3,083,303 | 3/1963 | Knowles et al | 307/88.5 |
| 3,201,600 | 8/1965 | Cosby | 307/88.5 |

FOREIGN PATENTS OR APPLICATIONS

| | | | |
|---|---|---|---|
| 808,331 | 2/1959 | Great Britain | 307/88.5 |
| 907,361 | 10/1962 | Great Britain | 307/88.5 |

OTHER PUBLICATIONS

Antipov et al., I.B.M. Technical Disclosure Bulletin, Vol. 2, No. 6, 4/60, (pp. 89 & 90).
Hilsenrath et al., I.B.M. Technical Disclosure Bulletin, Vol. 5, No. 7, 12/62, (pp. 29 & 30).
Atkins, I.B.M. Technical Disclosure Bulletin, Vol. 7, No. 7, 12/64, (pp. 596 & 597).

*Primary Examiner*—John Zazworsky
*Attorney*—Charles C. English and Sheldon Kapustin

[57] ABSTRACT

The invention includes a semiconductor circuit and in one mode comprises two transistors wherein the first operates as a common emitter whereas the second operates as an emitter follower. When the first transistor is in a non-conducting state and the second is conducting, the input level of the first is raised to almost the conduction level by a negative feedback signal. During the time that the first transistor is turned on (the transitory period), a relatively positive feedback signal after which a negative feedback signal is provided thereto. The latter signal prevents saturation of the first transistor.

11 Claims, 10 Drawing Figures

INVENTOR
JACK S. CUBERT

BY David Teschner

ATTORNEY

TRANSISTOR LOGIC CIRCUIT WITH UPSET FEEDBACK

This application is a continuation of Ser. No. 452,191, filed on Apr. 30, 1965, and now abandoned.

This invention pertains to transistor logic circuits and more particularly, to transistor logic circuits with upset feedback, permitting more rapid response of such transistor logic circuits to changes in the input levels applied thereto.

Transistors employed in prior art logic circuits, may be operated in either the unsaturated or the saturated mode. In the unsaturated mode of operation, the switching response of the transistor in response to input signals from non-conduction to conduction or rise time is slow whereas the switching response from conduction to non-conduction is relatively fast. Further, the output levels of transistors operated in the unsaturated mode, are poorly defined. To compensate for this poor switching response from conduction to non-conduction and provide better defined output levels, the transistors may be operated in the saturated mode. Transistors operated in the saturated mode show a speeded up or a more rapid rise time in their switching response curves when switching from the non-conduction to conduction stable states and provide a well defined level for each of these two stable states. However, the operation of transistors in the saturated mode produces certain undesirable effects. The storage of carriers in the base region of the transistor at both the base-emitter and base-collector junctions, requires a finite time for their removal, which time is much greater than that required to remove storage carriers at the base-emitter junction in the base region of a transistor operated in the unsaturated mode. The greater storage of charge carriers within the base region of transistors operated in the saturated mode, thus produces a limitation upon the speed of the switching response of such transistors from the conduction to non-conduction state. The unsaturated mode of transistor operation therefore provides a more rapid turn off of the transistor but requires a longer period to switch from non-conduction to conduction turn on time. The converse is true of transistors operated in the saturated mode which show a more rapid rise time in switching from non-conduction to conduction but requires a longer time to switch from conduction to non-conduction due to the increased storage of charge carriers within the base region.

One prior art transistor logic circuit employing a transistor operated in the saturated mode employs a capacitor in the base circuit of the transistor such that the capacitor can operate as an additional source of current for the transistor when it is desired to switch the transistor from conduction to non-conduction. This additional source of current permits a more rapid removal of the stored charge carriers in the transistor base and the response time of the transistor is decreased. This prior art transistor logic circuit unfortunately suffered from the inability of the capacitor to be varied in accordance with changing conditions of the transistor itself and with the impedance of the input source used to effect the turn off of the transistor. There is no way to automatically match the characteristics of the transistor to the characteristics of the capacitor and the input source. Thus, at times, too much current was available and at other times too little current was available to maximize the current available for turn off of the transistor to ensure optimum switching characteristics.

The present invention makes use of the best characteristics of both the unsaturated and saturated modes of operation and provides means whereby the transistors operated in the saturated mode may be turned off rapidly by a controlled current which is solely dependent upon the characteristics of the transistors themselves and not upon some external device such as a capacitor. A connecting path is provided between the emitter of the output transistor and the base of the input transistor of a two transistor logical circuit. The joint operation of these transistors function to provide negative feedback for stability of the circuit at certain times and upset feedback at other times during which transients exist as a result of changes in the input levels to cause switching. Proper feedback is provided along this connecting path such that the transistor being switched is aided in its change of state and the switching response time is minimized. It is therefore an object of this invention to provide an improved form of transistor logic circuit.

It is another object of this invention to provide an improved transistor logic circuit with upset feedback between its transistor stages.

It is yet another object of this invention to provide a transistor logic circuit with upset feedback between the emitter follower output stage and the input common emitter stage.

It is still another object of this invention to provide a transistor logic circuit with a feedback connecting path between the emitter of the emitter follower output stage and the base of the grounded emitter input stage of such a logic circuit, whereby the feedback path permits the conduction of negative feedback for stability and upset feedback in order to assist in the switching of the transistors of such a circuit.

It is still another object of this invention to provide an improved transistor logic circuit with upset feedback and with diode input devices to provide switching signals of discrete levels.

It is yet another object of this invention to provide an improved transistor logic circuit with upset feedback employing but a single transistor stage and employing further unilateral translating devices to provide the necessary feedback voltages.

Further objects and features of the invention will be pointed out in the following descriptions and claims, and illustrated in the accompanying drawings, which disclose, by way of example, the principles of the invention and the best modes which have been contemplated for carrying it out.

In the drawings:

FIG. 1; consisting of FIGS. 1*a* and 1*b*, illustrates the charge gradient in the base of a transistor operated in the unsaturated and saturated modes, respectively.

FIG. 2, consisting of FIGS. 2*a* and 2*b*, illustrates the switching curves for transistors operating in the unsaturated and saturated mode, respectively.

Similar elements will be given similar reference characters in each of the respective Figures.

Figures 1A, 1B:
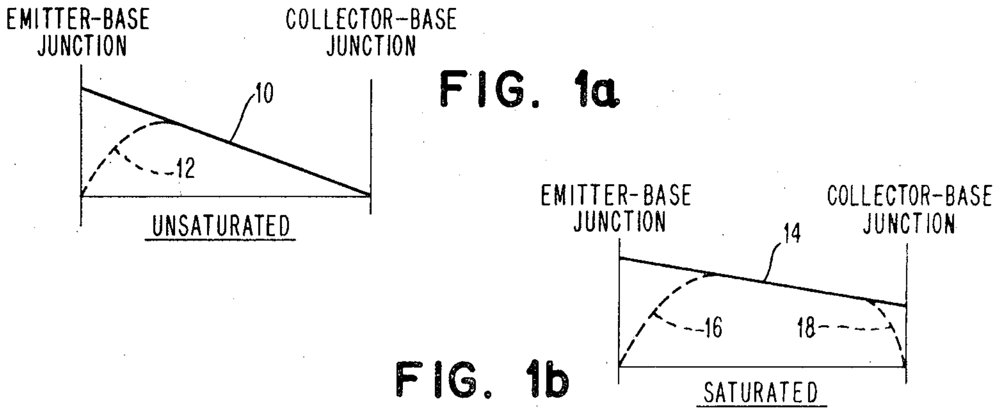

Turning now to FIG. 1, there is shown charge distribution diagrams for a base region of a PNP-transistor, operating in the unsaturated and saturated modes. The FIG. 1*a* shows the transistor operated in the unsaturated region and shows the charge gradiant 10 from the emitter-base junction at the left most portion of the figure to the collector-base junction at the right most portion of the figure. In the unsaturated mode of operation, the gradient will be zero at the collector-base junction and will be at some value above zero at the emitter-base junction. This condition is created by the biasing of the emitter positively while biasing the collector negatively. If it is desired to switch the state of the transistor by applying a positive value to the base, a certain finite time is required to diminish the charge level at the emitter-base junction to zero, as shown by the dotted line 12 in the FIG. 1*a*. This causes a slight delay in the ability of the transistor to respond or switch its state.

FIG. 1*b* shows the charge gradient 14 for the same PNP-transistor operated in the saturated mode wherein the charge level at the emitter-base junction is at some given value above zero. The collector-base junction charge level is also at some value other than zero, as distinguished from that shown in the unsaturated mode illustrated in FIG. 1*a*. If it is desired to switch this transistor by providing a positive signal to the base thereof, then it is necessary not only to discharge the charge stored at the emitter-base junction, as shown by the dash line 16 (similar to that shown for the unsaturated mode in FIG. 1*a*) but it is also necessary to discharge the collector-base junction, as shown by the second dotted line 18 at the right hand portion of FIG. 1*b*. Each discharge will take a finite period of time, the total time being greater than that required to discharge only the emitter-base junction.

Figure 2A:
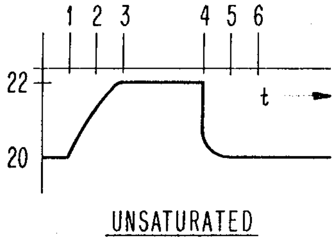
Figure 2B:
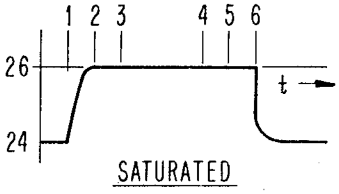

For better understanding of the relative time involved for charge discharge, reference is now made to FIGS. 2*a* and 2*b* which show the switching curves for the PNP-transistor operated in the unsaturated (FIG. 2*a*) and saturated modes (FIG. 2*b*). In FIG. 2*a*, showing the transistor operated in the unsaturated mode, it is assumed that a negative input signal is applied to the base of the transistor to turn it on. The output switching curve shows a slow rise time from the level 20 at time *t*1, until some level 22 is reached at time *t*3 when the transistor reaches its steady state output condition. This output level will continue until time *t*4 when the transistor is turned off by applying a positive signal to the base thereof. The transistor in turning off will follow an output decay curve from level 22 to level 20 during the time period *t*4 to *t*6. The level 20, which is assumed to be the turn off level and the level 22, which is assumed to be the turn on level, represent the output levels of the transistor in its steady state conditions and are relatively poorly defined for a transistor operated in the unsaturated mode, as is well known in the art.

FIG. 2*b* shows the saturated mode of operation for a similar transistor to that shown in FIG. 2*a*. The transistor initially off and at the level 24, is turned on at time t1, as is true of the transistor of FIG. 2*a* but the transistor of FIG. 2*b*, however, shows a faster rise time reaching its stable level 26 at a time *t*2. The faster response of the saturated mode of operation of the transistor over that of the unsaturated mode of operation of the transistor is generally due to the greater drive which is applied to the transistor to move it into the saturated region quickly. As with the transistor of FIG. 2*a*, a positive signal is applied to the base at time *t*4 and the transistor is driven towards its second stable condition. The saturated transistor of FIG. 2*b*, however, is not able to return immediately to the level 24 but must remain at the level 26 until sufficient time has elapsed for the removal of the stored charge at the collector-base junction as shown in FIG. 1*b*. Assuming it would take the period from *t*4 to *t*6 to completely remove the charge from the base, this transistor cannot begin to switch to its second condition and return to the level 24 until such time has elapsed.

Figure 3:
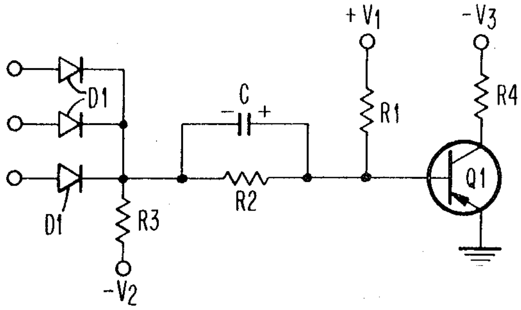
FIG. 3 PRIOR ART
FIG. 3 illustrates a prior art logic circuit in which a capacitor was employed to improve the switching characteristics of a transistor operated in the saturated mode.

FIG. 3 is a prior art transistor circuit, wherein a transistor Q1 is operated in the saturated region and provision is made to reduce the amount of time required for the transistor Q1 to be switched between its two stable states. This circuit includes a capacitor C placed in the base circuit of the transistor Q1, operated with diode OR gate inputs. If negative signals are applied to the anodes of each of the diodes D1 the diodes D1 will be turned off and current will pass from the positive voltage source $+V_1$ through the resistor R1, the parallel path consisting of resistor R2 and C respectively, the resistor R3 to the negative voltage source $-V_2$. As a result the capacitor C will be charged up positive to negative going in the direction of the source $+V_1$ to the source $-V_2$. The transistor Q1 will be turned on due to the base becoming negative with respect to the emitter held at ground potential. Base current from the transistor Q1 will flow in the path including resistors R2, R3 and the negative potential source $-V_2$. An output voltage will also be developed across the output resistor R4. The application of a positive input to any of the diodes D1 will turn that diode on and cause the capacitor C to alter its bias $+V_1$. As a result the capacitor C will provide a current into the base of the transistor Q1, to permit removal of the charge stored therein, and permit more rapid turn off of the transistor Q1.

The ability of the capacitor C to discharge the charge stored in the base of the transistor Q1 is dependent upon the value of the capacitor itself, the characteristics of the transistor Q1 and the impedance of the source supplying the positive turn off signal to the diode D1. The capacitive reactance of the capacitor C will vary with the capacitor life and the frequency of the applied signals, thus altering the amount of stored charge upon it and its ability to provide current to transistor Q1 for turn off. Variations in the transistor characteristics over its useful life will affect the amount of current required for turn off. Additionally, the impedance of the source will vary the rise time of the turn off signal altering the turn off current as well. Thus, in order to achieve turn off in the desired manner, it is necessary to provide a further device to match the turn off current to the particular transistor Q1. When there is no ability to match the capacitor directly to the characteristics of the transistor Q1, should the transistor vary in any way and require a longer period of charge withdrawal or a shorter period, it is not possible to vary the capacitor and to provide required charge withdrawal.

The circuits of the present invention, however, permit a controlled amount of charge withdrawal or overdrive such that the transistors may be cleared of stored charge and the time during which the elements are active will be mainly dependent upon the storage characteristics of the transistors themselves and to some degree dependent upon the loading placed upon the output of the transistor pair.

Figure 4:
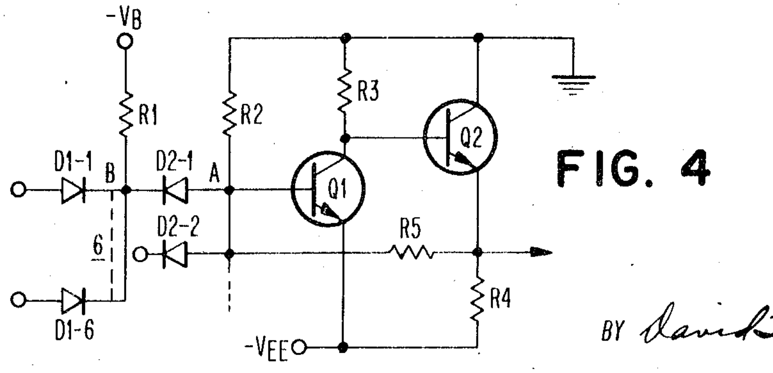
FIG. 4 illustrates the preferred embodiment of a two transistor logic circuit with upset feedback constructed in accordance with the principles of the invention.

Turning now to FIG. 4, there is shown a preferred embodiment of a two transistor logic circuit with upset feedback constructed in accordance with the concepts of this invention. The plurality of diodes D1–1 through D1–6, constituting an AND circuit, are arranged to receive inputs on their anodes and have their cathodes coupled to a common point which is in turn coupled through a resistor R1 to a source of negative potential $V_B$. The output of the AND gate constructed of the diodes D1–1 to D1–6 is coupled from their common cathodes to the cathode of a further diode D2–1, which constitutes one of the diodes of a diode OR gate. The remaining diodes D2, of which only D2–2 is shown are in turn coupled to further diode AND circuits not shown. The anodes of the diodes D2 are coupled at a point A through a resistor R2 to ground. In addition, the point A is also coupled to the base of a first transistor Q1 and in turn through a resistor R5 to the emitter of a second transistor Q2.

The transistor Q1 is operated in the common emitter mode whereas the transistor Q2 is operated in the emitter follower mode transistor. The collector of the transistor Q1 is connected through a resistor R3 to ground, whereas the emitter is connected to a source of negative potential $V_{EE}$. The collector of the transistor Q1 is also connected to the base of the transistor Q2. The collector of the transistor Q2 is in turn connected to ground and the emitter is connected through resistor R4 to the source of negative potential $V_{EE}$. An output is taken from the emitter of the transistor Q2 and further a feedback path exists by means of the resistor R5 connected to the emitter of the transistor Q2 and to the base of the transistor Q1.

In order that a full appreciation of the operation of the circuit might be possible, the circuit will be considered when operating in its two stable conditions as well as during the transitory conditions from the one stable condition to the other and vice versa.

The terms high and low are arbitrarily assigned and both may be positive, negative or of different polarities. In this description a low value is −2.5 volts and may be arbitrarily assigned as a binary one value. The high value is −1 volt and will be arbitrarily assigned the binary value of zero. Further the storage characteristics of the transistors Q1 and Q2 are such that after a change in the applied input level, the transistors will take a finite time to respond and change stable state. As a result the output available at the emitter of the transistor Q2, for example, will remain at its former level for sometime after the initial application of a different input voltage at the anodes of the diodes D1–1.

In the first stable condition, that is, with a low signal (−2.5 volts) applied to the anodes of the diodes D1 of the input And gate, the output signal on the emitter of the transistor Q2 will be high or −1 volt. The diodes D1 will be off and a current path is provided from ground through resistor R2 the diode D2–1, the resistor R1 to the source $-V_B$. The point A will be maintained at a negative potential such that the base of transistor Q1 has a negative value applied to it and the transistor Q1 remains off. A further current path extends from ground through resistor R3 to the base of the transistor Q2, causing the transistor Q2 to conduct heavily and produce a high output (−1 volt). The feedback path consisting of the resistor R5 coupled from the emitter of transistor Q2 to the base of transistor Q1 will supply a current to the base of transistor Q1 raising the potential of point A to a point close to the conduction level required to cause conduction of transistor Q1. This feedback from Q2 to Q1 will assist the transistor Q1 to turn on quickly when the input level to the diode D1–1 is switched. As such this feedback path permits the biasing of the base of transistor Q1, such that Q1 will be able to respond more rapidly to a change in input, when the input is switched. The transistor pair Q1, Q2 will remain stable in this condition as long as the input level is maintained low or −2.5 volts at the anodes of all of the input diodes D1. The feedback through the resistor R5 is negative feedback tending to maintain the device at a stable condition, in addition to providing the above described function of aiding turn on of transistor Q1.

Assuming now that the input signal to the anode of the input diode D1–1 is now changed from the low level of −2.5 volts to the high level of −1 volt. The diode D1–1 is made to conduct and raise the potential at point B, the junction between the cathode of the diode D1–1 and the cathode of the diode D2, to a point sufficiently high to cause the diode D2 to be disconnected and interrupt the current path from ground through the resistor R2, diode D2–1, resistor R1 to the negative source $-V_B$. Current will now be permitted to flow from ground through the resistor R2 to the base of the transistor Q1 causing the potential at point A to raise to a sufficient level to cause the transistor Q1 to be turned on. The current path for the transistor Q2 from ground through the resistor R3 to the base of the transistor Q2, still exists permitting transistor Q2 to continue to conduct. However, as transistor Q1 goes towards full conduction the current available to the base of transistor Q2 is decreased and transistor Q2 conducts less strongly until it reaches its steady state output of −2.5 volts. As a result the emitter of transistor Q2 will be maintained at a level close to the value of the emitter bias $-V_{EE}$. The output developed at the output terminal coupled to the emitter of transistor Q2 will be dependent upon the value of the emitter supply $-V_{EE}$, diminished by the voltage drop across the resistance R4. Further, during the transitory condition, the current flowing at point A as a result of the current flow through the resistor R2 from ground, is fed forward through the resistor R5 to the load resistor R4 as well as to the emitter of the transistor Q2, providing some stability of load output despite transistor Q2, conducting less strongly. Additionally this path provides a current limiter to transistor Q1. As long as transistor Q1 is being turned on, all needed current is available but as transistor Q1 begins to conduct strongly, unneeded base current is shifted to the output load. After the transistors Q1 and Q2 arrive at their stable conditions, the current in the path from ground via R2, R5 through R4 remains constant to provide a negative feedback and preserve the output current at a desired level.

This function of the feedback path, including resistor R5, may be termed upset feedback. During the time transistor Q1 is being turned on a relatively positive feedback is provided because of the upset or alteration of the input bias provided by the switching of the input signal. During this upset condition current fed back from the emitter of transistor Q2 to the base of transistor Q1 permits little or none of the current supplied to the base of transistor Q1 for turn on to be diverted to the load. As Q1 approaches full conduction, the upset in bias is ended due to the stabilization of the input signal and a negative feedback is established. This increases the current to the load and decreases the current to the base of transistor Q1. It is obvious that the control of the current application to the base of transistor Q1 for turn on is automatically controlled as a function of the transistors themselves independent of external devices.

The following application of low signals, that is, the application of a voltage of −2.5 volts will cause the diodes D1 to be turned off and cause the turning on of the diode D2–1, due to the increase in the negative level at point B with respect to the anode of D2–1 at ground. A current will flow from ground through the resistor R2, the diode D2–1, the resistance R1 to the negative supply $-V_B$. As a result of the current flow, the point A coupled to the base of the transistor Q1, will be made sufficiently negative to cause the transistor Q1 to be turned off. The flow of current in the loop consisting of ground, the resistor R2, diode D2, R1 and $V_B$ will provide a path to permit the quick removal of the stored charge at the base of the transistor Q1 and permit its being turned off more rapidly. Further, the output from the transistor Q2 will produce a current drain path through the resistor R5 from the base of the transistor Q1 and will thus aid in the rapid removal of the stored charge in the base of the transistor Q1. As the transistor Q1 is turned off, a greater current is permitted to flow via ground, resistor R3 to the base of the transistor Q2, which will be effective to cause transistor Q2 to conduct more strongly thus producing the high level output signal −1 volt. The output of the transistor Q2 will now be fed back via the resistor R5. The amount of the feedback will be determined by the path composed of the resistor R2, diode D1, and the resistor R1. Thus, a degree of feedback will be established which will permit the operation of the transistors Q1 and Q2 in a stable relationship.

To summarize the operation described above, the four steps will be retraced, namely (1) low input, that is −2.5 volts being applied to the anodes of the diodes D1 and the transistor Q2 producing a high level signal of −1 volt. (2) Transient condition resulting from the application of a high signal to the anode of diode D1–1 with the degree of conduction of the transistor Q2 remaining the same. (3) The stable condition with the high signal applied to the anode of the diode D1–1 and a low output being produced by the transistor Q2, and (4) the transitional stage from a high input to a low input signal on the anode of the diodes D1 while maintaining the output of the transistor Q2 on its high state.

During the stable condition in which a low signal of −2.5 volts is applied, the transistor Q1 will be off and the transistor Q2 will be conducting heavily and producing a high output level of −1 volt. Under these conditions, a negative feedback exists over the path from the emitter of the transistor Q2 via the resistor R5 to the base of the transistor Q1 maintaining it at a potential close to its turn on potential, such that the application of a small amount of current to the base of the transistor Q1 will rapidly turn the transistor Q1 on increasing the rise time and decreasing its switching time. Upon a switching of the input signal from the low value of −2.5 volts to the high value of −1 volt and during the transition stage of the circuit, the transistor Q2 will remain heavily conducting. While the transistor Q1 is being turned on a large amount of current will be available to the base of the transistor Q1 overdriving it and turning it on rapidly and a small amount of current, determined by the value of the resistor R2, and R5 be available in the feedback path for supplying the load and also for biasing the emitter of the emitter follower transistor Q2. Upon reaching a stable condition with the high value signal applied to the base of the transistor Q1, the transistor Q2 will reach lesser conduction state and the transistor Q1 is turned on with a feedback existing through the resistor R5 to maintain the transistor Q1 on. Switching of the input to diodes D1 from the high value of −1 volts and to the low value of −2.5 volts will cause the turning off of the transistor Q1 and provide a current path to permit the charge of the base of transistor Q1 to be rapidly reduced, the path consisting of the resistor R5 offering a path and additional discharge path for the base of transistor Q1 is established via the path consisting of resistor R5 and resistor R4. Finally upon reaching the stable condition a feedback will be developed from the hard conducting transistor Q2 via its emitter through the resistor R5 to the base of the transistor Q1 holding it again at a condition close to its on condition to permit the more rapid turning on upon the application of the next following low signal.

For maximum operation of this device the transistor Q2 is always operated at a non-saturated manner, and transistor Q1 may be operated in the saturated or in the non-saturated region. It is considered advisable to operate the transistor Q1 also in the non-saturated mode in that the loading placed across the resistor R4 is in most instances capacitive and this capacity must also be discharged during the switching of transistor Q1. Thus, with transistor Q1 operating in the non-saturated region, it is possible for the path consisting of resistor R5, R2, and ground to aid in the discharge of the stored voltage across on the capacitive elements to which the transistors are coupled.

Transistor Q2 can also be operated in the saturated manner providing a clamped voltage output in the high or −1 volt level. The result of this manner of operation is to provide a defined and stable output voltage and render the circuit insensitive to oscillations under certain output loading conditions.

Figure 5:
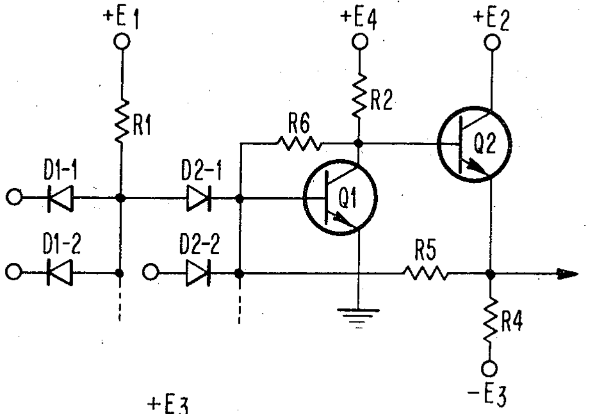
FIG. 5 shows a variation of the circuit of FIG. 4 and illustrates a furtherform which the transistor logic circuit with upset feedback may take.

Turning now to FIG. 5 there is illustrated a further form which the device of FIG. 4 may take. In this embodiment the diodes D1 form a diode OR gate instead of the AND gate as is described with reference to FIG. 4. Input signals are applied to the cathodes of the diodes D1 such that if one input is low the transistor Q1 will be turned off, whereas high inputs impressed upon the cathodes of all of the diodes D1 will cause the transistor Q1 to be turned on. The anodes of the diodes D1 are coupled to the anode of a diode D2–1, one of the diodes of the AND gate formed of the diodes D2. This is in distinction to that shown with reference to FIG. 4, wherein the diodes D2 are arranged with opposite polarity and form a diode OR gate. The collector of the transistor Q1 is connected through resistor R2 to a source of positive potential +E4 and the collector of the transistor Q2 is tied directly to a source of positive potential +E2. This is in distinction to the circuit of FIG. 4 wherein the collector of transistor Q1 is coupled through resistor R3 to ground and the collector of transistor Q2 is coupled directly to ground. The connection of the collectors to separate positive potential sources +E4 and +E2, respectively, as distinguished from the connection to a ground as in FIG. 4, merely changes the operating reference voltages for the circuit but does not alter its manner of operation. In a similar fashion, the emitter of the transistor Q1 is coupled to ground rather then the negative potential source $-V_{EE}$ as shown in FIG. 4. Such a connection also alters the reference level to ground rather than the negative potential of $-V_{EE}$. Further a resistor R6 is connected between the collector of the transistor Q1 and the base thereof. This resistor R6 provides an additional feedback path to prevent the transistor Q1 from being driven into the saturation region. The use of resistor R6 permits the control of the saturation of the transistor Q1 to be made dependent upon the resistor R6 and removes control thereof from the value of the resistor R5 forming the feedback from the emitter of transistor Q2 to the base of the transistor Q1. In FIG. 4 the value of the resistor R5 must be so chosen that the transistor Q1 is not permitted to go into saturation. The employment of the resistor R6 in the manner described frees this limitation upon the resistor R5 and gives a greater degree of freedom. The general manner of operation of the device is as described with reference to FIG. 4 and will not be repeated.

Figure 6:
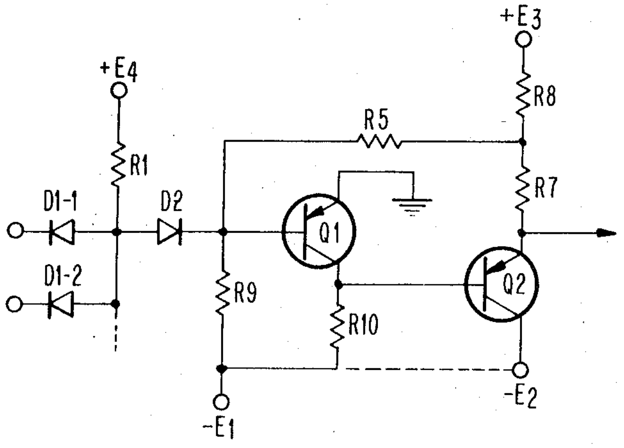
FIG. 6 shows a further embodiment of the device described with reference to FIG. 4, illustrating the circuit for use with PNP-transistors.

Turning now to FIG. 6 a version of the transistor logic with upset feedback employing a PNP type transistor is shown. The circuit is to a large extent similar to that shown with reference to FIGS. 4 and 5. The poleing of the diodes D1 and D2 is the same as that shown with reference to FIG. 5 and opposite to that shown in FIG. 4, thus providing for a logical OR gate followed by a logical AND gate. The feedback path, consisting of a resistor R5, is connected between a center tap position of the resistors R8 and R7 which are connected between a source of positive potential +E3 and the emitter of the transistor Q2. The reason for the center tap connection of the resistor R5 is to provide the proper bias in that germanium PNP-transistors provide smaller drops than silicon transistors used as the NPN-transistors of FIG. 4 and FIG. 5. Thus, the voltage divider consisting of resistors R7 and R8 is necessary in order to properly match the feedback requirements of transistors Q1 and Q2. The output of the circuit is taken from the emitter of the transistor Q2 as is true of the circuits of FIGS. 4 and 5. The base of transistor Q1 is connected to a source of negative potential −E1 by means of a resistor R9 whereas the base of the transistor Q2 is tied through a resistor R10 to the same source of negative potential −E1. The collector of the transistor Q2 is tied to a negative source −E2. The value of the negative potential −E2 may be so chosen as to act as a clamp upon the operation of the transistor Q2 by causing the collector-base diode to saturate. Additionally, the collector of transistor Q2 might also be tied directly to the source of negative potential −E1 to eliminate possible oscillation in the transistor Q2. The operation of the circuit of FIG. 6 is similar to that described with reference to FIG. 4 and it will not be described in further detail.

Figure 7:
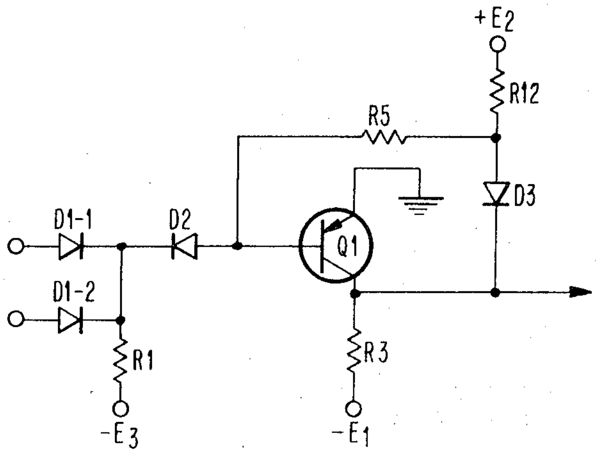
FIG. 7 illustrates a preferred embodiment of a transistor logic circuit with an upset feedback employing a single PNP-transistor and diode.

FIG. 7 shows a further embodiment of the device of FIG. 4 eliminating the necessity for a second transistor or voltage gain element. Instead, a diode is coupled between the collector and the base of the transistor Q1 to provide for voltage translation of the device. The diodes D1–1 and D1–2 are poled so as to form an AND gate-OR gate input network. The cathodes of the diodes D1–1 and D1–2 are tied via a resistor R1 to a source of negative potential −E3. The output of the diode OR gate taken from the anode of the diode D2 is fed to the base of the transistor Q1 operated in the grounded emitter configuration. The collector of the transistor Q1 is connected through a resistor R3 to a source of negative potential −E1. The collector of transistor Q1 is also tied to the cathode of a diode D3 used for voltage translation. The anode of the diode D3 is coupled through a resistor R12 to a source of positive potential +E2 and through a further resistor R5 to the base of the transistor Q1 to provide the necessary upset feedback path as described above with reference to FIG. 4. The device is found useful in logic devices wherein the gain required from a second transistor is not necessary and in which a circuit of minimal cost is desired.

Figure 8:
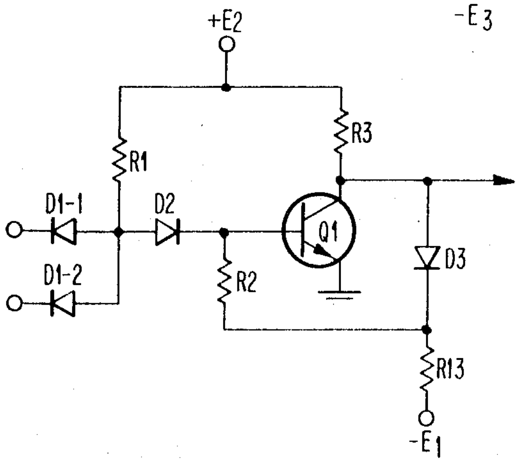
FIG. 8 illustrates a further embodiment of the transistor logic circuit with upset feedback of FIG. 7 employing a single NPN-transistor and diode.

Turning now to FIG. 8 there is shown an embodiment of a device similar to FIG. 7 but employing an NPN-type transistor. The inputs are applied to the cathodes of the diodes D1–1 and D1–2 operate as an OR circuit. The anodes of the diodes D1–1 and D1–2 are connected in common to the anode of a second diode D2 employed as a logical AND gate. The anodes of the diodes D1–1 and D1–2 and D2 are coupled through a resistor R1 to a source of positive potential +E2. The output of the input diode network is taken from a cathode of the diode D2 and fed to the base of a NPN-transistor Q1 operated in the grounded emitter configuration. The base of transistor Q1 is also coupled through resistors R2 and R13 to a source of negative potential −E1. The collector of transistor Q1 is coupled via a resistor R3 to the source of positive potential +E2, as well as to the anode of the diode D3. The cathode of the diode D3 is also coupled by means of resistor R13 to the source of negative potential − E1 as well as to the resistor R2. In this arrangement the diode D3 and the resistor R2 will provide the upset feedback path for the transistor Q1.

While there have been shown a number of embodiments of transistor logic circuits employing upset feedback and requiring the use of single and double transistor stages, it is not intended to limit the scope of this invention to those devices shown and described in that other modifications of this device will be obvious to one skilled in the art and are not considered a part herefrom.

I claim:

1. A switching circuit arrangement comprising:
a. at least one semiconductor device having an input and output means;
b. means for applying a signal to said input means,
said device being placed by said signal in a steady-state ON or in the alternative in a steady-state OFF condition,
said device being momentarily placed in a transitory state by said signal when said device is switched from the steady-state ON to the steady-state OFF and from the steady-state OFFto the steady-state ON;
c. feedback means coupled from said output means to said input means;
d. said feedback means transmitting a degenerative signal from said output means to said input means after said signal places said device in said steady-state condition;
e. said degenerative signal placing said input means at a voltage level for preventing said device from conducting into saturation after said signal places said device in the steady-state ON condition;
f. said degenerative signal further placing said input means at a voltage near its conduction state after said signal places said device in the steady-state OFF condition;
g. said feedback means in addition transmitting a regenerative signal from said output means to said input means after said signal places said device in said transitory condition;
h. said regenerative signal applying a voltage to said input means to place it at a level to cause said device to rapidly switch to the steady-state ON condition.

2. The circuit in accordance with claim 1 wherein a logical circuit arrangement comprising an AND gate and an OR gate is connected to said input means.

3. The circuit in accordance with claim 1 wherein said semiconductor device is an NPN- or, in the alternative, a PNP-transistor.

4. A switching circuit arrangement comprising
a. at least first and second semiconductor devices which are coupled to one another,
said first device which has an input means being operated in the common emitter and said second device being operated in the emitter follower mode;
b. means for applying a signal to said first device;
said first device being placed by said signal in a steady-state ON condition and said second device being placed in the steady-state OFF condition,
and in the alternative, said signal placing said first device in a steady-state OFF condition and said second device in the steady-state ON condition,
said devices being momentarily placed in a transitory state by said signal when said device is switched from the steady-state ON to the steady-state OFF and from the steady-state OFF to the steady-state ON;
c. feedback means coupled from said second to said first semiconductor;
d. said feedback means transmitting a degenerative signal from said second device to said first device after said signal places said devices in a steady-state condition;
e. said degenerative signal placing said input means at a voltage level for preventing said device from conducting into saturation after said signal places said first device in a steady-state ON condition;
f. said degenerative signal further placing said first device near its conduction level after said signal places said first device in the steady-state OFF condition;
g. said feedback means in addition transmitting a regenerative signal from said second device to said first device after said signal places said devices in said transitory condition;
h. said regenerative signal applying a voltage to said input means to place it at a level to cause said device to rapidly switch to the steady-state ON condition.

5. The circuit in accordance with claim 4 wherein a logical circuit arrangement comprising an AND gate and an OR gate is connected to said input means.

6. A signal translating circuit comprising:
a. a first and second transistor device, each comprising an emitter electrode, a base electrode, and a collector electrode;
b. a signal input circuit coupled to the base electrode of said first transistor device;
c. a switchable signal source coupled to said signal input circuit, said signal source capable of producing two separate and distinct input voltages;
d. a signal output circuit coupled to the emitter electrode of said second transistor device;
e. first coupling means coupled between the base electrode of said second transistor device and the collector electrode of said first transistor device;
f. said emitter of said first transistor and said collector of said second transistor being coupled to potential sources;
g. second coupling means comprising a first resistor coupled between the emitter electrode of said second transistor device and the base electrode of said first transistor device to provide a path for first and second feedback types;
h. said first type of feedback existing between said first and second transistor devices via said second coupling means when said signal source is producing either of said input voltages and
i. a second type of feedback existing between said first and second transistor devices via said second coupling means for a period of time following the switching of said signal source from one to the other of said two input voltages.

7. The signal translating circuit in accordance with claim 6 where said first and second transistor devices are NPN-transistors each having a base, emitter and collector electrode and wherein,
a. a first bias means is coupled to the base electrode of said first transistor device, and
b. a second bias means is coupled to the emitter electrode of said first transistor,
c. said first and second biasing means biasing said first transistor device in a relatively non-conducting state,
d. third biasing means coupled to the emitter electrode of said second transistor device to bias it in a relatively conducting state.

8. The circuit in accordance with claim 7 wherein third coupling means comprising a second resistor are coupled between said base electrode of said first first transistor device and said third biasing means,
whereby a first type of feedback exists between said first and second transistor devices via said third coupling means when said signal source is producing either of said input voltages and
a second type of feedback exists between said first and second transistor devices via said third coupling means for a period of time following the switching of said signal source from one to the other of said two input voltages.

9. A signal translating circuit comprising:
a. first and second NPN-transistor devices, each transistor device having a base electrode, a collector electrode and an emitter electrode;
b. first bias means coupled to the collector electrode of said first transistor device,
c. second bias means coupled to the base electrode of said first transistor device,
d. said first and second biasing means biasing said first transistor device in a relatively non-conducting state;

e. first coupling means including a resistor coupled between the collector and base electrodes of said first transistor device to prevent said first transistor means from being operated in a saturated condition;

f. third biasing means coupled to the collector electrode of said second transistor device;

g. fourth biasing means coupled to the emitter electrode of said second transistor device;

h. said third and fourth biasing means biasing said second transistor device in a relatively conducting state;

i. a signal input circuit coupled to the base electrode of said first transistor device;

j. a switchable signal source coupled to said signal input circuit, said signal source being capable of producing two separate and distinct input voltages;

k. a signal output circuit coupled to the emitter electrode of said second transistor device;

l. second coupling means coupled between the collector electrode of said first transistor device and the base electrode of said second transistor device;

m. third coupling means including a further resistor coupled between the emitter electrode of said second transistor device and the base electrode of said first transistor device, whereby a first type of feedback exists between said first and second transistor devices via said third coupling means when said signal source is producing either of said input voltages and a second type of feedback exists between said first and second transistor devices via said third coupling means for a period of time following the switching of said signal source from one to the other of said two input voltages.

10. A signal translating circuit in accordance with claim 7 wherein said first and second transistor devices are PNP-types and a. said first bias means is coupled to the base electrodes of said first and second transistor devices; and b. said second bias means is coupled to the emitter electrode of said first transistor device and c. said first and second bias means biasing said first transistor device in a relatively non-conducting state; and d. third biasing means coupled to the emitter electrode of said second transistor device, e. said first and third biasing means biasing said second transistor device in a relatively conducting state;

f. a signal input circuit coupled to the base electrode of said first transistor device;

g. a switchable signal source coupled to said signal input circuit and said signal source capable of producing two separate and distinct input voltages;

h. a signal output circuit coupled to the emitter electrode of said second transistor device;

i. said first coupling means coupling the collector electrode of said first transistor device to the base electrode of said second transistor device; and j. fourth biasing means coupled to collector electrode of said second transistor device to limit the conduction thereof;

k. impedance means comprising a first and a second resistor coupled in series and coupled between said third biasing means and said emitter electrode of said second transistor device;

l. said second coupling means including a third resistor coupled to the coupling point of said first and second resistors and the base electrode of said first base electrode of said first transistor device, whereby a first type of feedback exists between said first and second transistor devices via said second coupling means when said signal source is producing either of said input voltages and a second type of feedback exists between said first and second transistor devices via said second coupling means when said signal source is producing either of said input voltages and a second type of feedback exists between said first and second transistor devices via said second coupling means for a period of time following the switching of said signal source from one to the other of said two input voltages.

11. The signal translating circuit as defined in claim 10 wherein said fourth biasing means is provided by coupling said collector electrode of said second transistor device to said first biasing means whereby said second transistor device is prevented from oscillating.

* * * * *